United States Patent [19]

Hall

[11] 4,222,173
[45] Sep. 16, 1980

[54] SHAFT AND BORE MISALIGNMENT MEASUREMENT TOOL

[75] Inventor: John W. Hall, Lusby, Md.

[73] Assignee: The United States of America as represented by the Secretary of the Navy, Washington, D.C.

[21] Appl. No.: 973,053

[22] Filed: Dec. 22, 1978

[51] Int. Cl.³ .............................................. G01B 5/25
[52] U.S. Cl. .............................. 33/180 R; 33/174 Q; 33/181 R; 33/185 R
[58] Field of Search ............. 33/174 Q, 180 R, 185 R, 33/191, 178 R, 181 R, 169 C, 412

[56] References Cited

U.S. PATENT DOCUMENTS

| | | | |
|---|---|---|---|
| 1,607,862 | 11/1926 | Bath | 33/178 R |
| 2,694,261 | 11/1954 | Dulligan | 33/178 R |
| 3,336,677 | 8/1967 | Newton | 33/185 R |
| 3,534,480 | 10/1970 | Jordan et al. | 33/174 Q |

*Primary Examiner*—Willis Little

*Attorney, Agent, or Firm*—R. S. Sciascia; Sol Sheinbein; Lawrence E. Anderson

[57] ABSTRACT

A tool for determining misalignment of a coupling bore located in one end of a rotatable machine shaft. The tool includes a plurality of radially expandable split rings disposed side-by-side along the outer surface of a hollow, tubular collet body, an elongated mandrel assembly coaxially carried by the collet body, and a dial displacement indicator releasably carried on the mandrel assembly. The mandrel assembly includes a taper or mandrel portion partially disposed within the collet body, a stem portion projecting outwardly from the collet body, a threaded portion disposed adjacent the mandrel portion, and an adjusting nut having a threaded portion engaged with the mandrel assembly threaded portion. The collet body is placed in the shaft coupling bore and the adjusting nut turned so that the mandrel portion is drawn through the collet body, the latter thereby expanding and forcing the rings into "locking" engagement with the wall of the shaft coupling bore.

17 Claims, 7 Drawing Figures

SHAFT AND BORE MISALIGNMENT MEASUREMENT TOOL

BACKGROUND OF THE INVENTION

The present invention relates to measurement tools and more particularly to tools for detecting and measuring the extent of misalignment between a machine shaft coupling bore and the shaft.

Measuring tools have traditionally been used in connection with various machine operations to perform different functions. For example, they have been employed for measuring eccentricity of work at progressive stages of machining, for centering boring devices and work pieces, one with respect to the other, and for checking alignment of the boring device and the work during the machining process. This class of tools is exemplified by U.S. Pat. No. 3,336,677 to Newton. There, the patentee was concerned with centering the tool bit with a pilot hole in the work piece in order to establish a reference point. That reference point was then used in the determination of the outer diameter of the hole desired in the work piece, and the drill bit was accordingly adjusted. The patentee employed a collet-and-mandrel fastener for securing the tool in the pilot hole of the work piece. Measurements taken to determine the final work piece hole diameter were made with the aid of the tool, but without reference to the fastener.

In another, and perhaps more critical, area of machine operations, measuring tools have been used to detect and measure misalignment between rotating machine shafts. Typically, rotating mechanical equipment includes a number of elements coupled by drive shafts. These shafts are supported by bearing assemblies and have end coupling bores designed to receive other mating rotating shafts. The end coupling bores may include simple keyway interlocks, intricate spline arrangements, or any other similar coupling mechanisms designed for torque transmission. In order to insure the most efficient use of rotary mechanical equipment, when two mating shafts are coupled, they must be designed so that their respective axes of rotation are coincident. Otherwise, during operation the misaligned shafts will generate destructive forces causing unbalance, axial movement, coupling wear, shaft fatigue, bearing failure and other related problems. The machine shaft is disposed in a housing having a mounting plate which includes a mounting bore concentric with the shaft, the mounting plate further including a surface which interfaces with the housing of a cooperating machine shaft.

One method used to determine shaft misalignment involves attaching a sensitive displacement measuring device, such as a dial indicator, to the shaft, and, while the shaft is rotated, traversing the mounting interface and the mounting bore. Traversing the mounting interface yields a determination of the lack of perpendicularity between the mounting interface and the shaft bearing axis of rotation. Traversing the mounting bore yields a measure of eccentricity. A major drawback to this procedure is that the measurements are taken with respect to the axis of rotation of the shaft, and not with respect to the shaft coupling bore axis. This is an important consideration since if a coupling bore's axis does not coincide with the axis of rotation of the shaft, due to machining or assembly errors, the abovementioned destructive forces will be generated.

Conventional methods of measurement using dial indicators attached to the shaft are limited to the determination of errors associated with the axis of rotation. For simple coupling bores having a keyway interlock, the measurement technique is relatively simple. However, for involute splined bores, no such simple method has heretofore been developed. Rather, methods utilizing such equipment as analog plotters have been employed, where individual splines within the couplings have been mapped and their position recorded on the plotter. Once all splines have been so mapped at several sections, the coupling axis of the splined bore may be mathematically determined. Clearly, this apparatus is difficult for the ordinary mechanic or machinist to understand. Moreover, the apparatus is much too cumbersome for use in restricted spaces such as aircraft engine compartments or ship engine rooms. Consequently, the standard inspection or measurement methods have been limited to the simpler determination of the shaft axis of rotation with respect to the housing mounting bore and mounting interface.

SUMMARY OF THE INVENTION

Accordingly, the tool assembly of the present invention measures the extent of misalignment between the coupling bore of a shaft and the shaft, regardless of the geometry of the bore without the attendant problems discussed hereinabove. The determination of misalignment of the longitudinal axis of the coupling bore with respect to the axis of rotation of the shaft requires two sets of measurements. The first set is employed to determine whether the shaft is concentrically supported within its bearing assemblies, and the second set of measurements is employed to determine whether the longitudinal axis of the shaft coincides, within predetermined tolerance limits, with the longitudinal axis of the coupling bore. The assembly includes a radially expandable tubular collet having a centrally disposed longitudinal passage extending therethrough, a plurality of radially expandable rings disposed therearound, and a mandrel having a body portion disposed in the collet central opening and a shank portion projecting from the opening. The mandrel cooperates with the collet central passage to uniformly expand the collet. The tool assembly is disposed in the coupling bore and the mandrel is drawn longitudinally through the collet, forcing the rings into engagement with the coupling bore of the shaft, to thereby lock the tool in longitudinal alignment with the coupling bore axis of the shaft. A dial indicator is mounted on the mandrel shank portion, and any misalignment is detected by either rotating the dial indicator about the shank portion while the shaft is held fixed, or by fixing the dial indicator on the shank portion and rotating the shaft in its supporting bearing assemblies.

OBJECTS OF THE INVENTION

It is therefore an object of the present invention to provide a tool for detecting and measuring shaft misalignment.

Another object of this invention is to provide a simple, inexpensive and accurate tool which may be fixed in a shaft coupling bore so that the longitudinal axes of the tool and the coupling bore are coincident.

Another object of the present invention is to provide a tool which permits measurements of misalignment to be taken with respect to the longitudinal axes of the shaft coupling bore.

A further object of this invention is to provide a compact and portable diagnostic tool which can be used to measure misalignment of shaft coupling bores having torque transmitting keyways or splines.

Yet another object of this invention is to provide a hand-held diagnostic tool permitting in situ direct readings so that proper coupling alignments of machine shafts is readily facilitated, even in the field.

Still another object of the present invention is to provide uniform expansion of a radially expandable collet along its axial extent.

BRIEF DESCRIPTION OF THE DRAWINGS

Other objects and many of the attendant advantages of this invention will readily be appreciated as the same becomes better understood by reference to the following detailed description when considered in connection with the accompanying drawings in which like reference numerals designate like parts throughout the figures thereof and wherein.

DESCRIPTION OF THE PREFERRED EMBODIMENT

Figure 1:
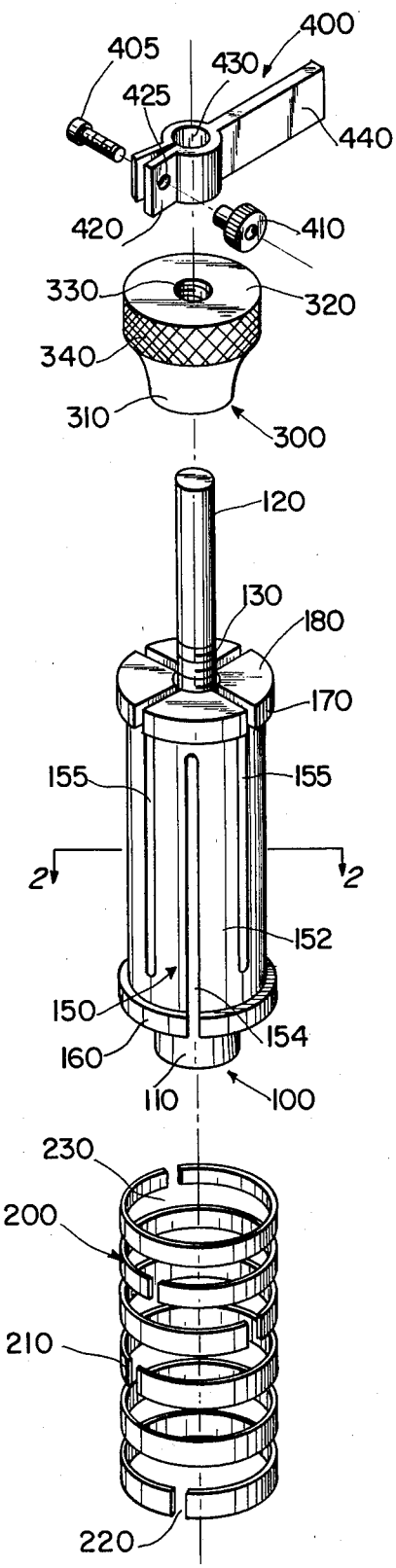
FIG. 1 is an exploded perspective view of the tool.
Figure 2:
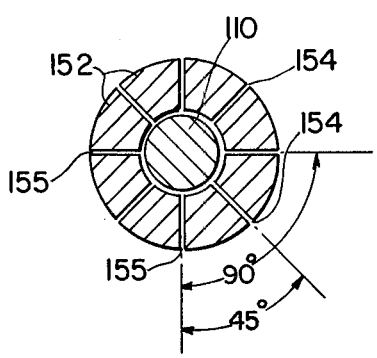
FIG. 2 shows a cross-sectional view of the tool of FIG. 1, in the direction of lines 2—2 midway along the collet body.
Figure 3:
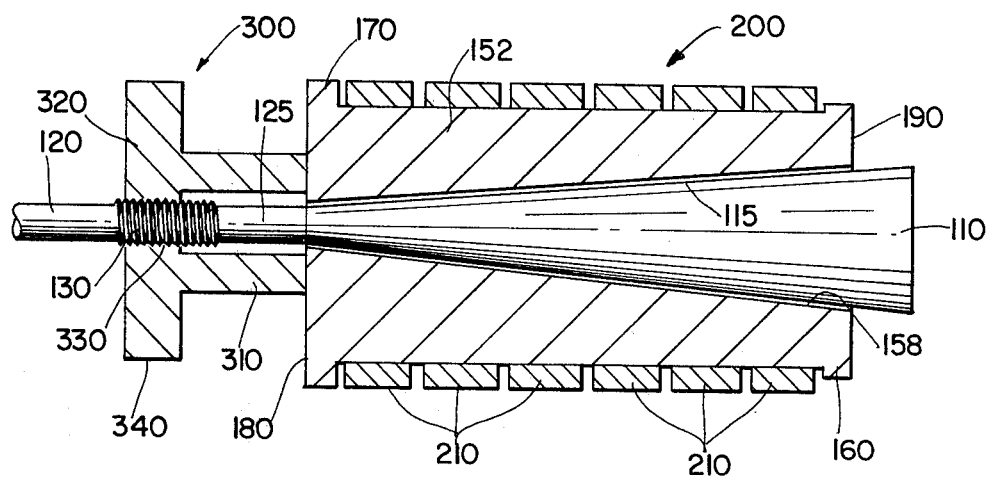
FIG. 3 is a cross-sectional view of the assembled tool, taken along the longitudinal axis of the mandrel.

Referring now to the drawings, wherein like characters and numerals designate like or corresponding parts throughout the several views, there is shown in FIG. 1 a rod-like mandrel assembly 100, having at one end a taper or mandrel portion 110, and at the other end a stem portion, the latter including a shank 120 and threaded portion 130 disposed rearwardly of the shank. As more clearly shown in FIG. 3, connecting portion 125, located adjacent to, and forwardly of, mandrel portion 110, spaces the mandrel portion from threaded portion 130. Mandrel portion 110 possesses a truncated conical shape, with the smaller diameter thereof being located adjacent connecting portion 125. FIG. 3 further reveals that shank 120, connecting portion 125, threaded portion 130 and the end of mandrel portion 110 adjacent connecting portion 125 all have substantially the same outer diameter. A cylindrical tubular sleeve-like collet assembly 150 is disposed concentrically about mandrel assembly 100 with all of the mandrel portion 110 except the rear end thereof being located radially interiorly of collet body 152. Collet body 152 also includes forward shoulder 170 and rearward shoulder 160, and is formed with slots 154 and slots 155, all of which extend longitudinally along a major portion of the length thereof. Slots 154, cut from collet forward end face 180 rearwardly toward collet rear shoulder 160, are located 90° from one another as seen when looking at the collet forward end face. Slots 155, cut from collet rear end face 190 (see FIG. 3) forwardly toward collet forward shoulder 170, are located 90° from one another as when seen looking at the collet rear end face. Slots 154 and slots 155, as seen in FIG. 2, are spaced 45° apart from each other about the circumference of collet body 152. These slots enable the collet body to expand radially outwardly when the body is subjected, internally, to outwardly directed forces. FIG. 3 shows collet body 152 having a concentric internal passageway 158 extending longitudinally through the body from forward end face 180 of the collet body to rearward end face 190 of the collet body. Internal passageway 158 has a tapered configuration complementary to the tapered or conical configuration of mandrel portion 110, as defined by external surface 115 of the mandrel portion. That is, passageway 158 has its smallest diameter at forward end face 180 of collet body 152 and its largest diameter at rearward end face 190 of the collet body.

Ring assembly 200, shown in FIGS. 1 and 3, is disposed over and about the circumference of collet body 152 in the region located between the forward and rear shoulders thereof, i.e., in the area defined forwardly of the forward face of collet rear shoulder 160, and rearwardly of the rearward face of collet forward shoulder 170. Ring assembly 200 includes a plurality of resilient, radially expandable ring elements 210, each of which are split (see 220 in FIG. 1). The plurality of ring elements are designed to include between adjacent ones some spacing 230, as shown in FIG. 1. Although six ring elements have been shown to comprise ring assembly 200 in the figures, the assembly may include any number of ring elements 210, depending on the width of each ring element, the longitudinal extent of collet body 152 between forward shoulder 170 and rear shoulder 160, the amount of spacing desired between each adjacent ring element, etc. It is important to note that forward shoulder 170 of collet body 152 extends radially outwardly a distance greater than the thickness of each ring element 210, and rear shoulder 160 extends radially outwardly from the outer surface of collet body 152 a distance greater than the thickness of each of ring elements 210.

Also shown in FIGS. 1 and 3 are adjusting nut 300 and dial indicator support arm assembly 400. Adjusting nut 300 is shown to have tail portion 310 and head portion 320, the head portion including threaded portion 330 and gripping portion 340. These latter two portions, together with the threads of nut threaded portion 330 and mandrel threaded portion 130 being of such dimensions as to be engageable by each other, permit adjusting nut 300 to be tightened on the mandrel threaded portion. Adjusting nut 300 need not include tail portion 310 and may take the shape of a simple washer having a length extending from the forward face of head portion 320 to the forward face of forward shoulder 170 of the collet assembly. In this case, the mandrel assembly would be designed to have some, or all, of connecting portion 125 eliminated; the amount being dependent on the longitudinal extent of the adjusting nut head portion. Tail portion 310 may, on the other hand, be desirable for purposes of spacing threaded portions 330 and 130 from mandrel portion 110 and collet forward shoulder 170, as where coupling bore CSB is not easily accessible from the outer or forward surface of mounting plate MP of the machine to be tested. Moreover, gripping portion 340, although shown here to be knurled, may also have any other suitable surface, as for example wrench flats. Finally, tail portion 310 may be separate from adjusting nut head portion 320 and may also be of material different from the head portion, to provide a bearing surface for the head portion.

Dial indicator support arm assembly 400 includes support arm clamp 430 having an interior surface configured to slidably receive mandrel shank 120, and support arm 440 on which a dial indicator may be mounted. Support arm clamp 430 is fixed against movement along mandrel shank 120 by support arm clamp plates 420 which are tightened against one another having a rectangular cross-section, may have any other desired cross-sectional shape, as for example that shown in FIGS. 4 and 5.

Assembly of the tool components depicted in FIG. 1 may be carried out easily and quickly in the following manner:

(1) collet body 152 is disposed over mandrel portion 110 so that the threads of threaded portion 130 of the mandrel assembly are located in front of forward end face 180 of collet forward shoulder 170;

(2) ring elements 210 of the ring assembly are separately passed over rear shoulder 160 of collet body 152, and seated on the collet body in the region located between collet forward shoulder 170 and the collet rear shoulder;

(3) adjusting nut 300 is placed on mandrel shank 120 so that the threads of nut threaded portion 330 engage the threads of mandrel threaded portion 130; and (4) dial indicator support arm clamp 430 is placed over mandrel shank 120 so that the shank is received in the support arm clamp, the clamp being slid along the shank to the desired location at which point it is secured to the shank by tightening pinch bolt 410.

Figure 4:
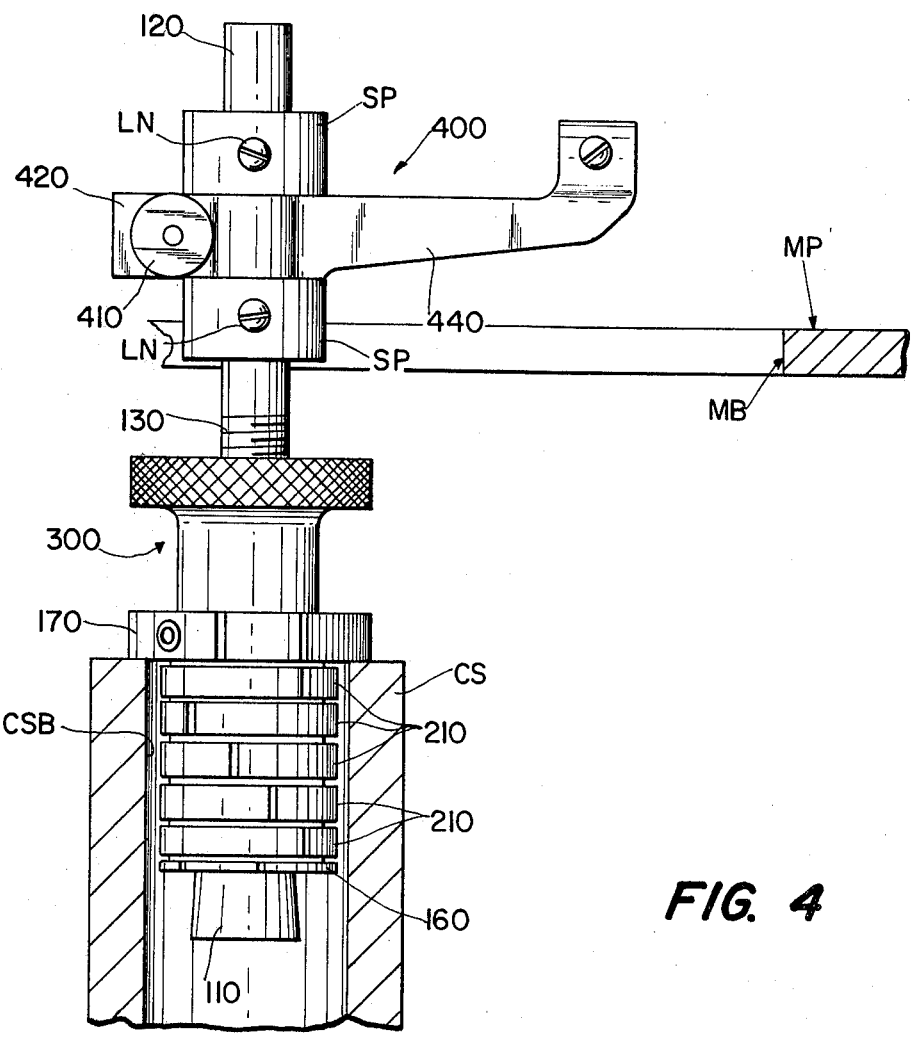
FIG. 4 depicts a machine shaft coupling bore and mounting plate in section, with the tool shown in perspective disposed in, but not engaged with, the bore of the shaft.

Referring now to FIG. 4, after the tool has been assembled, it is mounted for use on one end of a machine shaft CS with mandrel portion 110 and ring elements 210 together disposed in the coupling bore CSB of the shaft. While threaded portion 330 of adjusting nut 300 is shown in engagement with mandrel threaded portion 130, neither collet assembly 100 nor ring assembly 200 has been expanded so as to effect engagement of ring elements 210 with coupling bore CSB. The tool illustrated in FIG. 4 includes spacer blocks SP which may be employed in addition to pinch bolt 405 and pinch nut 410 of support arm assembly 400 to ensure that dial indicator support arm assembly 400 slides as little as possible along shank 120. Blocks SP are positioned forwardly and rearwardly of the dial indicator support arm assembly on mandrel shank 120, and have lock bolts LN for clamping blocks SP to shank 120.

While the tool remains positioned in shaft coupling bore CSB, i.e., while the tool is held on shaft CS such that the rearward face of collet forward shoulder 170 abuts the forward end surface of machine shaft CS, adjusting nut 300 is rotated so that its threaded portion 330 coacts with mandrel threaded portion 130 to move the mandrel threaded portion axially through adjusting nut threaded portion 330, and out from coupling bore CSB. Accordingly, mandrel portion 110 of the tool mandrel assembly is drawn through collet body passageway 158 in a forwardly direction. As the conical mandrel portion 110 travels forwardly, it uniformly contacts the surface of collet body passageway 158 throughout the entire length thereof, and in doing so imparts a uniform radially outwardly directed force at all points along the wall of passageway 158. Thus, the tool becomes "locked" in shaft coupling bore CSB (note FIG. 5), collet assembly 150 and ring elements 210 expanding radially and uniformly outwardly, the latter being forced into engagement with the wall of the shaft's coupling bore CSB. Clearly, it can be appreciated that because ring elements 210 are separated along the length of collet body 152, regardless of the contour of the shaft coupling bore CSB, the above-described "locking" effect will always occur.

Figure 5:
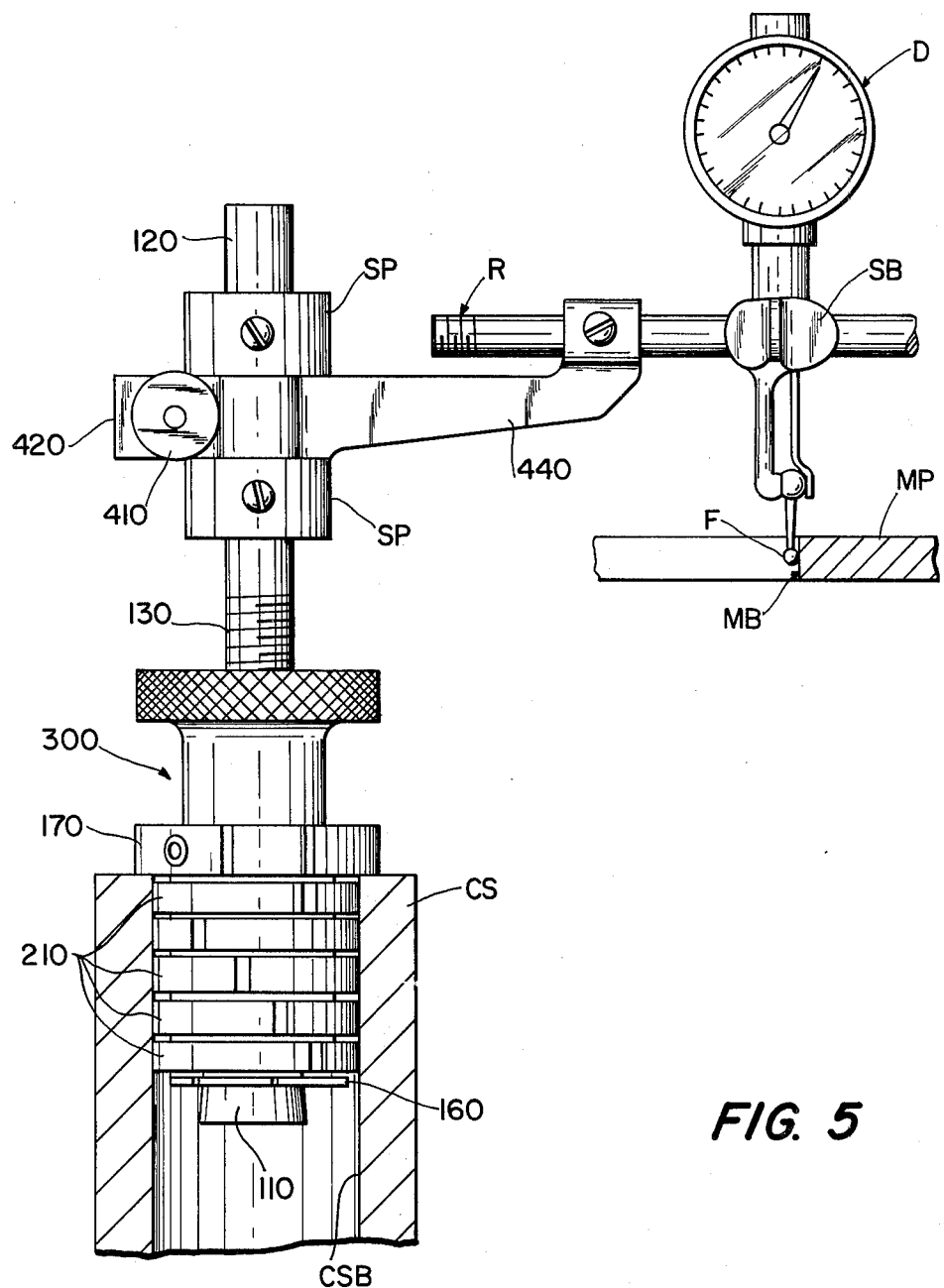
FIG. 5 illustrates a machine shaft coupling bore and mounting plate in section, with the tool shown in perspective, engaged with the bore of the shaft.

Referring now to FIG. 5, dial indicator D is thereupon attached to support arm 440 of dial indicator support arm assembly 400. Rod R, supporting dial indicator D, is fastened to the end of arm 440 closest to the wall of mounting bore MB. Support arm assembly 400 is then vertically adjusted on mandrel shank 120 so that feeler F of dial indicator D is positioned either for engagement with the wall of mounting bore MB, as shown in FIG. 5, or for engagement with the forwardmost surface of mounting plate MP (see also FIGS. 6 and 7, and the following description thereof).

Figure 6:
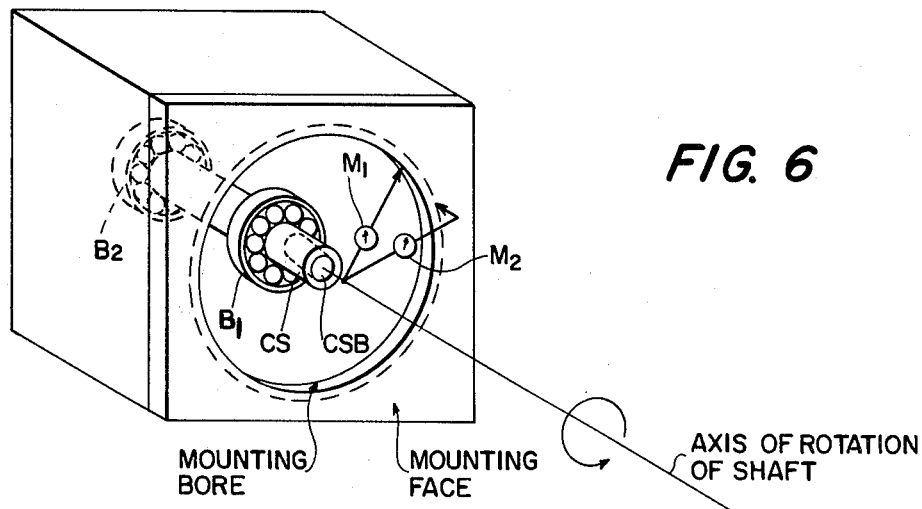
FIG. 6 shows a machine housing and shaft assembly with an illustration of one prior art technique of taking measurements to determine shaft alignment.
Figure 7:
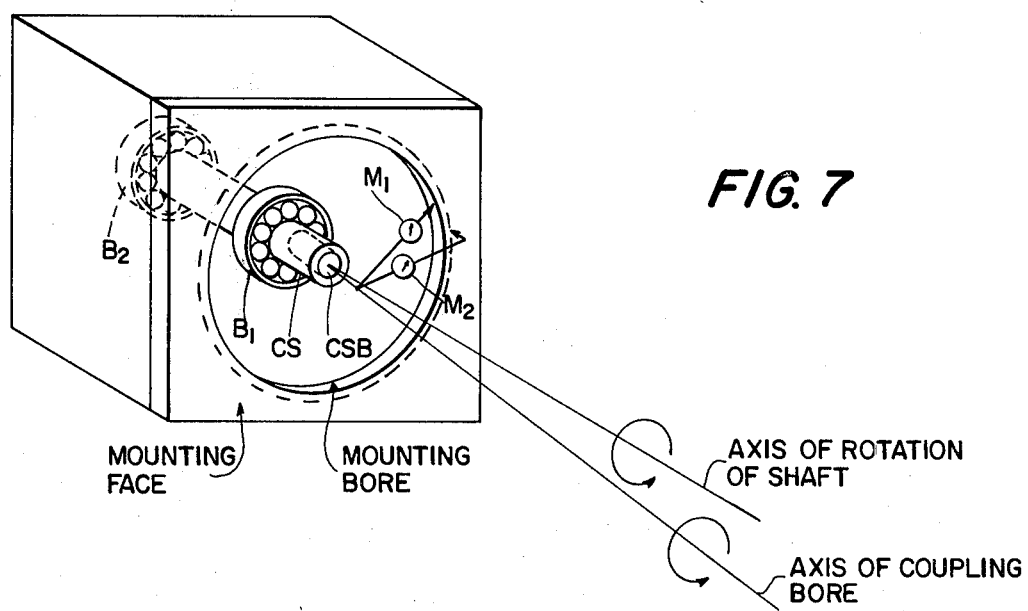
FIG. 7 shows a machine housing and shaft assembly with an illustration of the inventive technique of taking measurements to determine shaft coupling bore alignment.

FIGS. 6 and 7 illustrate a machine component, such as for example, a transmission mechanism, motor drive shaft, a torque converter, etc., which includes a rotating shaft CS, rotatably supported by bearing assemblies $B_1$ and $B_2$ spaced apart on, and disposed along, the longitudinal extent of shaft CS, a mounting plate MP at the forward end of the machine component, and a mounting bore MB located in mounting plate MP such that the longitudinal axis of rotation of the shaft CS coincides with the center of bore MB. Shaft CS is shown to terminate near mounting plate MP inside the machine component, the end of shaft CS including a coupling bore CSB, generally provided for such purposes as insuring connection of, or torque transmission between, mating shafts.

FIG. 6 depicts a known technique used in detecting misalignment in a rotating shaft arrangement which, however, has been limited to measurements made with respect to the longitudinal axis of shaft CS. As noted above in regard to the description of the prior art, these measurements have been effected by securely affixing a displacement measuring device, such as a dial indicator, to shaft CS and while rotating the shaft:

(1) traversing mounting bore MB with feeler F of the dial indicator (schematically shown as $M_1$ in FIG. 6) to determine the degree of eccentricity of shaft CS in bore MB, and (2) traversing mounting plate MP with feeler F of the dial indicator (schematically shown as $M_2$ in FIG. 6) to determine the degree of perpendicularity between mounting plate MP and the axis of rotation of shaft CS.

The tool of the present invention is used in carrying out the method primarily as a quality control measure to insure that shaft CS is properly supported within its bearing assemblies.

A determination, however, of whether the longitudinal axis of shaft CS coincides, within predetermined tolerance limits, with the longitudinal axis of coupling bore CSB located in the end of shaft CS requires an additional set of measurements which are obtained with the aid of the tool of the present invention. The technique employed to detect misalignment, in a rotating shaft arrangement, of coupling bore CSB within the end of shaft CS, is depicted in FIG. 7 and involves affixing the tool of the present invention within coupling bore CSB of shaft CS, as described in connection with FIG. 4, and:

(1) loosening pinch bolt nut 410 of dial indicator support arm assembly 400 to allow rotation of dial indicator D about the longitudinal axis of coupling bore CSB, (2) traversing housing mounting bore MB with feeler F of the dial indicator (schematically shown as $M_1$ in FIG. 7) to determine the degree of eccentricity of coupling bore CSB in bore MB, and (3) traversing mounting plate MP with feeler F of the dial indicator D (schematically shown as $M_2$ in FIG. 7) to determine the degree of perpendicularity between mounting plate MP and the longitudinal axis of coupling bore CSB in coupling shaft CS.

The measurements of this method, it should be noted, are unlike those of the first-mentioned method in that they are taken with respect to the longitudinal axis of coupling bore CSB of the shaft CS.

There has therefore been described a compact, portable, hand-held tool with which rapid and accurate measurements may be made to aid in the determination of the degree of misalignment of a shaft with respect to its supporting bearing assemblies, and the degree of misalignment of a shaft coupling bore with respect to the axis of rotation of the shaft. The tool includes a portion designed for insertion into a shaft coupling bore, located in the end of a rotating machine shaft, and expansion of the inserted portion results in the tool being "locked" in the bore such that the longitudinal axis of the tool becomes coincident with the coupling bore's longitudinal axis. Installation is required at only one location and no further adjustment is necessary, once the tool has been attached at the desired location, throughout the measurement and diagnostic procedure. Since the tool is simply constructed, easily assembled, and permits direct readings, it finds utility as, for example, a quality control inspection device, in detection of shaft misalignment not only on isolated equipment, but also on installed machinery such as aircraft and shipboard engines, and may be employed during manufacture, repair, or overhaul.

The present invention is further advantageous inasmuch as it facilitates previously unobtainable measurements pertaining to alignment of shaft coupling bores which include torque transmitting spline arrangements or keyways. The tool also facilitates detection of "tolerance stack-up" induced misalignment between shafts to be connected as well as detection of misalignment where shafts cannot be readily rotated by hand, or which exhibit axial play or chatter.

Obviously many modifications and variations of the present invention are possible in the light of the above teachings. It is therefore to be understood that, within the scope of the appended claims, the invention may be practiced otherwise than as specifically described.

What is claimed is:

1. A tool for determining misalignment between the longitudinal axis of a rotatable shaft and the longitudinal axis of a coupling bore disposed in said rotatable shaft comprising:

means for engaging the wall of said coupling bore;
said engaging means comprise a plurality of radially expandable cylindrical members;
means, coacting with and carried by said engaging means, for expanding said engaging means into engagement with said wall so that the longitudinal axis of the tool is coincident with the longitudinal axis of said coupling bore; and
means coupled to said expanding means for indicating said misalignment;
whereby misalignment between the longitudinal axis of the rotatable shaft and the longitudinal axis of the coupling bore may be determined by fixing the rotatable shaft against rotation and rotating said indicating means about said expanding means.

2. A tool as set forth in claim 1 wherein said cylindrical members comprise resilient, split, ring members.

3. A tool as set forth in claim 2 wherein said expanding means includes a cylindrical sleeve member having an internal conical passageway.

4. A tool as set forth in claim 3 wherein said expanding means further includes forward and rearward radially outwardly directed shoulders located at forward and rearward ends of said sleeve member, said shoulders defining therebetween a groove, said ring elements being disposed in spaced adjacency longitudinally along the outer surface of said sleeve member in said groove.

5. A tool as set forth in claim 3 wherein said expanding means further comprises a rigid mandrel including a wedging portion disposed in said internal passageway, the wedging portion having a contour complementary with the contour of said passageway.

6. A tool as set forth in claim 5 wherein said mandrel further includes a shank portion disposed forwardly of said sleeve member, said indicating means being coupled to the forwardmost region of said shank portion, said wedging portion having a truncated conical shape and including a forward end of a first diameter and a rearward end of a second larger diameter, said shank portion being contiguous to said wedging portion forward end and having the same diameter.

7. A tool as set forth in claim 6 wherein said shank portion further includes a threaded region located forwardly of, and adjacent to, said forward end of said sleeve member, said expanding means further comprising an adjusting nut having a central threaded bore threadedly engaged with said threaded region of said shank portion so that as said adjusting nut is rotated said threaded region is drawn through said threaded bore of said adjusting nut, said wedging portion of said mandrel moves toward the forward end of said sleeve member, and the conical surface of said wedging portion engages the conical surface of said internal passageway of said sleeve member;
whereby said sleeve member expands uniformly and said rings disposed thereabout are forced into "locked" engagement with said wall of said coupling bore.

8. A tool as set forth in claim 1 wherein said expanding means comprises resilient, cylindrical sleeve means, said sleeve means including a tapering internal passageway for snugly receiving said expanding means.

9. A tool as set forth in claim 8 wherein said expanding means includes means for contacting said internal passageway, said contacting means having a contour complementary with the contour of said passageway.

10. A tool as set forth in claim 9 wherein said expanding means further comprises a shank portion disposed forwardly of said contacting means for supporting said indicating means, said contacting means having a truncated conical shape and including a forward end having the same diameter as said shank portion.

11. A tool as set forth in claim 10 wherein said expanding means further comprises means for adjusting the position of said contacting means relative to said passageway in a forward or rearward direction, said adjusting means coacting with said shank portion forwardly of said forward shoulder of said sleeve;
   whereby when said contacting means is moved forwardly in said passageway by the coaction of the adjusting means with the shank portion, said sleeve means expands into interlocking engagement with the wall of said coupling bore.

12. A method of determining misalignment of a coupling bore located within one end of a rotatable shaft, said shaft being supported for rotation along its longitudinal axis by bearing assemblies, comprising the steps of:
   inserting and locking a tool within said coupling bore so that the longitudinal axis of said tool is aligned with the longitudinal axis of said coupling bore;
   mounting an indicator on said tool for rotation about said longitudinal axis of said tool, said indicator having a sensing means attached thereto;
   providing a reference plane normal to said axis of said shaft, and a mounting bore in said reference plane in which said shaft is concentrically disposed;
   positioning said indicator along said axis of said tool so that said sensing means is engageable with said reference plane;
   locking said indicator against rotation about the longitudinal axis of said tool;
   rotating said shaft, and hence said indicator affixed thereto, so that said indicator sensing means contacts said mounting bore to measure the degree of eccentricity of said shaft within said mounting bore;
   rotating said shaft, and said indicator affixed thereto, so that said indicator sensing means contacts said reference plane to measure the lack of perpendicularity between said reference plane and said shaft;
   whereby determination of whether the longitudinal axis of said shaft is concentrically disposed within said bearing assemblies may be enabled; and
   fixing said shaft against rotation about its longitudinal axis;
   unlocking said indicator from said tool so that said indicator is free to rotate about the longitudinal axis of said tool;
   rotating said indicator about said tool axis so that said sensing means contacts said mounting bore to measure the degree of eccentricity of said shaft in said mounting bore;
   rotating said indicator about said tool axis so that said sensing means contacts said reference plane to measure the lack of perpendicularity between said reference plane and said shaft;
   whereby determination of whether said longitudinal axis of said coupling bore is aligned with the longitudinal axis of said shaft may be enabled.

13. The method of claim 12 wherein the determination of whether the longitudinal axis of said shaft is concentrically disposed within said bearing assemblies comprises the step of comparing the two measurements taken, when the indicator was locked on said tool, with predetermined acceptable tolerances.

14. The method of claim 12 wherein the determination of whether the longitudinal axis of said coupling bore is aligned with the longitudinal axis of said shaft comprises the steps of comparing the two measurements taken, when the indicator was rotatable on said tool, with predetermined acceptable tolerances.

15. Misalignment measurement apparatus comprising:
   a rotatable shaft having a longitudinal axis, and a coupling bore disposed longitudinally within one end of said shaft, said bore having a longitudinal axis;
   means for engaging the wall of said coupling bore;
   means coacting with and carried by said engaging means, for expanding said engaging means into engagement with said wall so that the longitudinal axis of the tool is coincident with the longitudinal axis of said coupling bore; and
   means coupled to said expanding means for indicating said misalignment;
   whereby misalignment between the longitudinal axis of the rotatable shaft and the longitudinal axis of the coupling bore may be determined by fixing said indicating means to said expanding means and rotating said shaft.

16. A tool for determining the misalignment between the longitudinal axis of a rotatable shaft and the longitudinal axis of a coupling bore disposed in one end of said shaft comprising:
   means for mounting the tool in said coupling bore, said mounting means including a plurality of expandable cylinders surrounding a sleeve member having a tapered internal passage extending therethrough;
   means, coupled to and carrying said mounting means, for expanding said mounting means into engagement with said wall so that the longitudinal axis of said tool is coincident with the longitudinal axis of the coupling bore, said expanding means including means for contacting said internal passage, said contacting means having a contour complementary with the contour of said passage; and
   means coupled to said expanding means for indicating said misalignment;
   whereby misalignment between the longitudinal axis of the shaft and the longitudinal axis of the coupling bore may be determined by fixing the shaft against rotation and rotating said indicating means about said expanding means.

17. A tool for determining misalignment between the longitudinal axis of a rotatable shaft and the longitudinal axis of a coupling bore disposed in said shaft comprising:
   means for engaging the wall of said coupling bore;
   means, carrying said engagement means, for expanding said engaging means into engagement with said wall so that the longitudinal axis of the tool is coincident with the longitudinal axis of said coupling bore,
   said expanding means including a cylindrical sleeve member having an internal conical passageway, and a rigid mandrel including a wedging portion disposed in said internal passageway for translation therethrough, said wedging portion having a contour complementary with the contour of said internal passageway; and
   means coupled to said expanding means for indicating said misalignment;
   whereby translation of said wedging portion through said passageway operates to lock said engaging means in said coupling bore such that misalignment between the longitudinal axis of the shaft and the longitudinal axis of the coupling bore may be determined by fixing the shaft against rotation and rotating said indicating means about said expanding means.

* * * * *